US010422391B2

(12) United States Patent
Lv et al.

(10) Patent No.: US 10,422,391 B2
(45) Date of Patent: Sep. 24, 2019

(54) CLUTCH DRIVING DEVICE FOR DECELERATION CLUTCH

(71) Applicant: QINGDAO HAIER WASHING MACHINE CO., LTD., Laoshan, Qingdao (CN)

(72) Inventors: Peishi Lv, Qingdao (CN); Gangjin Zhang, Qingdao (CN); Yun Tian, Qingdao (CN)

(73) Assignee: QINGDAO HAIER WASHING MACHINES CO., LTD., Shandong, Qingdao (CN)

(*) Notice: Subject to any disclaimer, the term of this patent is extended or adjusted under 35 U.S.C. 154(b) by 316 days.

(21) Appl. No.: 15/322,556

(22) PCT Filed: Sep. 30, 2014

(86) PCT No.: PCT/CN2014/087882
§ 371 (c)(1),
(2) Date: Dec. 28, 2016

(87) PCT Pub. No.: WO2016/000335
PCT Pub. Date: Jan. 7, 2016

(65) Prior Publication Data
US 2017/0159723 A1 Jun. 8, 2017

(30) Foreign Application Priority Data

Jun. 30, 2014 (CN) .......................... 2014 1 0308632

(51) Int. Cl.
*F16D 23/12* (2006.01)
*D06F 37/30* (2006.01)
(Continued)

(52) U.S. Cl.
CPC ............. *F16D 23/12* (2013.01); *D06F 37/30* (2013.01); *D06F 37/40* (2013.01); *F16D 11/14* (2013.01);
(Continued)

(58) Field of Classification Search
CPC .......... F16D 11/14; F16D 23/12; F16D 28/00; F16D 2023/123; F16D 2023/141; D06F 37/30; D06F 37/40
See application file for complete search history.

(56) References Cited

U.S. PATENT DOCUMENTS 2,974,542 A * 3/1961 Barbulesco ............. D06F 13/04
192/3.51
4,291,556 A * 9/1981 Mason .................... D06F 37/40
192/89.21

(Continued)

FOREIGN PATENT DOCUMENTS

CN 2443980 Y 8/2001
CN 201924194 U 8/2011
(Continued)

OTHER PUBLICATIONS

International Search Report (PCT/ISA/210) dated Apr. 1, 2015, by the State Intellectual Property Office of the P. R. China as the International Searching Authority for International Application No. PCT/CN2014/087882.
(Continued)

*Primary Examiner* — Huan Le
(74) *Attorney, Agent, or Firm* — Buchanan Ingersoll & Rooney PC

(57) ABSTRACT

A driving device for a deceleration clutch, comprises a on a driving motor shaft. The drive wheel has a supporting surface with a height difference in the axial direction. A head of a shift fork lever controls the clutch sleeve to move up and
(Continued)

down. A tail of the shift fork lever is supported on the supporting surface. The tail of the shift fork lever relatively slides on the supporting surface, so that a height of the tail of the shift fork lever changes which drives a height of the head of the shift fork and further drives the clutch sleeve to move up and down. Alternatively, the drive wheel has a supporting slide rail with a height difference in the axial direction, or has cam circumference that is radially gradient, or a bracing rod is eccentrically arranged on an end surface of the drive wheel.

20 Claims, 9 Drawing Sheets

(51) Int. Cl.
     *D06F 37/40*     (2006.01)
     *F16D 11/14*     (2006.01)
     *F16D 28/00*     (2006.01)
     *F16D 23/14*     (2006.01)
(52) U.S. Cl.
     CPC ........ *F16D 28/00* (2013.01); *F16D 2023/123* (2013.01); *F16D 2023/141* (2013.01)

(56) References Cited

U.S. PATENT DOCUMENTS 5,353,902 A * 10/1994 Flowtow ................. F16D 23/12
     192/84.6
2003/0131636 A1* 7/2003 Lim ........................ D06F 37/40
     68/23.7

FOREIGN PATENT DOCUMENTS

| CN | 202157204 U | 3/2012 |
|---|---|---|
| GB | 191126122 A | 6/1912 |

OTHER PUBLICATIONS

Written Opinion (PCT/ISA/237) dated Apr. 1, 2015, by the State Intellectual Property Office of the P. R. China as the International Searching Authority for International Application No. PCT/CN2014/087882.

* cited by examiner

CLUTCH DRIVING DEVICE FOR DECELERATION CLUTCH

FIELD OF THE INVENTION

The present disclosure relates to the field of washing machine, and more particularly, to a clutch driving device for deceleration clutch.

BACKGROUND OF THE INVENTION

The existing technology, such as a washing machine on the market provided with a deceleration clutch which is parallel installed with a single-phase asynchronous motor and driven by the pulley and belt. This kind of deceleration clutch has the characteristics of low efficiency, high noise, poor practicability, and high failure rate of the transmission part, so the technical proposal of the coaxial setting of the motor and clutch is put forward. So the relevant technical personnel put forward the technical solution for setting motor and clutch coaxial. Such as a patent with patent number ZL00234747.4 discloses a deceleration clutch of a washing machine directly driven by brushless motor. The patent uses a brushless motor directly driving the washing machine clutch, solves the problem that single phase asynchronous motor has a low efficiency, and improves the energy efficiency. But the structure of the motor connection is complex, can only implement the ordinary washing method. Since the deceleration clutch has many shortcomings such as: the main parts have too many connection components, the installation requirements are too high, high fault rate, so the deceleration clutch of the solution from the patent is not suitable for manufacture.

Such as a Chinese patent with application number CN201120257375.8 discloses a variable frequency deceleration clutch of a bionic had rub washing machine, wherein the clutch comprises a mating lower casing and an input shaft. A brushless DC motor stator is mounted on the lower casing, and an outer rotor of the brushless DC motor is connected with the end of the input shaft, the brushless DC motor stator is located in the outer rotor chamber of the brushless DC motor. The input shaft is equipped with a sliding clutch mechanism composed of a sleeve, a clutch shaft, a clutch slider and a return spring. The sleeve is arranged on the input shaft, the clutch shaft is arranged on the input shaft above the sleeve, the sleeve and the clutch shaft are made with outer spline, the inner peripheral guide splines of the clutch slider are coupled to the outer peripheral splines of the sleeve and the clutch shaft, the return spring is press-fitted on an annular boss formed on the outer periphery of the clutch slider and the clutch slider is connected with a clutch control mechanism. But the clutch control mechanism is complex and cumbersome to control.

Some of the conventional clutch sleeves or clutch slides are controlled by a shift fork and a clutch spring together to move up and down, and the shift fork is directly mounted on the lower casing of the deceleration clutch by the rotation pin to realize the control of the clutch sleeve. In the prior art, a traction motor is often used to pull one end of the shift fork through a rope, and the other end controls the clutch sleeve or the clutch slider to move up and down, the traction motor often installed at the bottom of the outer tub. However, the method of controlling the up-and-down movement of the clutch sleeve has a low accuracy rate, a high failure rate, a large occupied space, and a low component integration ratio.

In view of the foregoing, the present invention is proposed.

SUMMARY OF THE INVENTION

An object of the present disclosure is to overcome the drawbacks of the prior art and to provide a driving device for deceleration clutch.

To achieve the above object, a technical solution is applied in the present disclosure: a driving device for a deceleration clutch, comprises a drive motor, a drive wheel, a shift fork lever and a clutch sleeve, the drive wheel is directly arranged on a driving motor shaft, a drive wheel axis is parallel with an axis line of the clutch sleeve, the drive wheel is provided with a supporting surface has a height difference in the axial direction, a head of the shift fork lever is a shift fork for controlling the clutch sleeve to move up and down, a tail of the shift fork lever is a drive end supported on the supporting surface, the drive motor drives the drive wheel to rotate, the tail of the shift fork lever relatively slides on the supporting surface, so that a height of the tail of the shift fork lever changes which drives a height of the head of the shift fork lever changes and further drives the clutch sleeve to move up and down.

The drive wheel comprises a cylindrical body, the drive wheel is provided with the supporting surface having a height difference in the axial direction on a circumferential surface or an end surface, preferably, at least a portion of the circumferential surface of the cylindrical body extends radially outwardly to faun an arcuate projection, one surface in the axial direction of the arcuate projection is a supporting surface, further preferably, the supporting surface comprises an inclined first transition surface, a highest supporting surface, and a second transition surface inclining inversely with respect to the first transition surface which are sequentially connected in the circumferential direction.

A top surface or a bottom surface of the drive end of the shift fork lever is in contact with the supporting surface of the drive wheel, a contacting surface is a flat surface or a curved surface corresponding to the supporting surface.

preferably, the contacting surface is a curved surface corresponding to the supporting surface, further preferably, the contacting surface comprises an inclined third transition surface, a highest contacting surface, and a fourth transition surface inclining inversely with respect to the third transition surface which are sequentially connected in the circumferential direction, further preferably, an end surface of the drive end of the shift fork lever is an arc wall corresponding to the cylindrical body of the drive wheel.

An axial upper surface of the projection of the drive wheel is the supporting surface, a lower surface of the drive end of the shift fork lever is the contacting surface in contact with the supporting surface;

the supporting surface comprises the upwardly inclined first transition surface, the highest supporting surface and the downwardly inclined second transition surface;

the contacting surface comprises the downwardly inclined third transition surface, the highest contacting surface and the upwardly inclined fourth transition surface.

The axial lower surface of the projection of the drive wheel is the supporting surface, an upper surface of the drive end of the shift fork lever is the contacting surface in contact with the supporting surface, the supporting surface comprises the downwardly inclined first transition surface, the highest supporting surface and the upwardly inclined second transition surface, the contacting surface comprises the upwardly inclined third transition surface, the highest contacting surface and the downwardly inclined fourth transition surface.

The highest arcuate supporting surface of the drive wheel and the highest contacting surface of the shift fork are in surface contact or arc-surface contact.

A portion of a circumferential surface of an end portion of the drive wheel extends radially outwardly to form a projection, the other circumferential surface of the end portion is a circumferential surface of the cylindrical body.

An entire circumferential surface of the end portion of the drive wheel extends radially outwardly to form a projection, the projection comprises a highest supporting surface and a lowest supporting surface, the highest supporting surface and the lowest supporting surface are circumferential spaced by 180°, the transition between the highest supporting surface and the lowest supporting surface is oblique.

The shift fork lever is a lever structure and a fixed fulcrum is set in the middle part, preferably, the middle part of the shift fork lever is mounted on a fixed bracket to constitute a revolute joint, the fixing bracket is fixed on the deceleration clutch shell, or the fixed bracket is integrally provided with the deceleration clutch shell.

A first mounting hole is arranged at the middle of the shift fork lever, a second mounting hole is arranged at a corresponding position of the fixed bracket, the mounting holes are hinged by a rotary pin to form the fixed fulcrum of the shift fork lever, a torsion spring for providing a resetting force to the shift fork lever is further provided on the rotary pin, preferably, the fixed fulcrum is located at the middle of the shift fork lever and a side near the tail.

A driving device for a deceleration clutch comprises a drive motor, a drive wheel, a shift fork lever, the drive wheel is directly mounted on a motor shaft of the drive motor, the drive wheel axis is parallel to the axis of a clutch sleeve, the drive wheel in the circumferential direction is provided with a supporting slide rail with a height difference in the axial direction, a head of the shift fork lever is a shift fork for controlling the clutch sleeve to move up and down, a tail of the shift fork lever is a drive end supported in the supporting slide rail. The drive motor drives the drive wheel to rotate, the tail of the shift fork lever relatively slides in the supporting slide rail, so that a height of the tail of the shift fork lever changes which drives a height of the head of the shift fork lever changes and further drives the clutch sleeve to move up and down.

The drive wheel comprises a cylindrical body, the cylindrical body is radially inwardly recessed on the circumferential surface to form a circle of an axial height-gradient groove which is the supporting slide rail, a height of the supporting slide rail is changed smoothly in the axial direction.

The supporting slide rail comprises a lowest supporting surface, an inclined first transition surface, a highest supporting surface and a second transition surface inclining inversely with respect to the first transition surface which are sequentially connected in the circumferential direction, and connection of each surface has smooth transition.

The highest support surface and the lowest support surface are circumferentially spaced by 180°.

The tail of the shift fork lever extends into the supporting slide rail of the drive wheel, the tail of the shift fork lever includes at least a first surface in contact with the lowest supporting surface and a second surface in contact with the highest supporting surface, and the lowest support surface is in surface contact with the first surface, the highest support surface is in surface contact with the second surface.

The drive end of the shift fork lever is provided with a rolling bearing which extends into the supporting slide rail of the drive wheel.

An axis of a motor shaft of the drive motor is parallel to an axis of the clutch sleeve, the drive motor is mounted on a deceleration clutch shell, or the drive motor is mounted on a mounting plate of the deceleration clutch.

The shift fork lever is a lever structure and a fixed fulcrum is set in the middle part, preferably, the middle part of the shift fork lever is mounted on a fixed bracket to constitute a revolute joint, the fixing bracket is fixed on the deceleration clutch shell, or the fixed bracket is integrally provided with the deceleration clutch shell.

A first mounting hole is arranged at the middle of the shift fork lever, a second mounting hole is arranged at a corresponding position of the fixed bracket, the mounting holes are hinged by a rotary pin to form the fixed fulcrum of the shift fork lever, preferably, the fixed fulcrum is located at the middle of the shift fork lever and a side near the tail.

The tail of the shift fork lever has an arc wall which mates with the cylindrical body of the drive wheel, a middle of the arc wall extends perpendicularly to the arc wall and extends into the supporting slide rail of the drive wheel, and is connected with the supporting slide rail.

A driving device for a deceleration clutch comprises a drive motor, a drive wheel and a shift fork lever, the drive wheel is a cam structure, and the cam circumference is radially gradient, a head of the shift fork lever is a shift fork for controlling a clutch sleeve to move up and down, a tail of the shift fork lever is a drive end with a sliding contacting surface supported on a cam circumferential surface. The drive motor drives the cam to rotate, the sliding contacting surface of the shift fork lever is in contact with a circumference with a different radius of the cam to make the height change, which drives a height of the head of the shift fork lever changes and further drives the clutch sleeve to move up and down.

The cam is directly mounted on a motor shaft of the drive motor, an axis of the motor shaft of the drive motor is perpendicular to an axis of the clutch sleeve.

An upper side or a lower side surface of the drive end of the shift fork lever is in contact with the cam circumferential surface, a side surface of which the tail of the shift fork lever contacts the cam circumference surface is concave corresponding to a position of the cam circumferential surface to form a clamping slot, or two ends of the side surface of which the tail of the shift fork lever contacts the cam circumference surface are convex corresponding to a position of the cam circumferential surface to from a clamping slot.

The shift fork lever is a lever structure and a fixed fulcrum is set in the middle part, the middle part of the shift fork lever is mounted on a fixed bracket to constitute a revolute joint, the fixing bracket is fixed on a deceleration clutch shell, or the fixed bracket is integrally provided with the deceleration clutch shell.

A first mounting hole is arranged at the middle of the shift fork lever, a second mounting hole is arranged at a corresponding position of the fixed bracket, the mounting holes are hinged by a rotary pin to form the fixed fulcrum of the shift fork lever, a torsion spring for providing a resetting force to the shift fork lever is further provided on the rotary pin, preferably, the fixed fulcrum is located at the middle of the shift fork lever and a side near the tail.

The cam is located below the drive end of the shift fork lever, the lower side of the drive end of the shift fork lever is provided with the clamping slot which is supported on the cam circumferential surface, the shift fork lever is provided with the torsion spring which provides the resetting force to move the head of the shift fork lever upward.

The cam is located above the drive end of the shift fork lever, the upper side of the drive end of the shift fork lever is provided with the clamping slot which is supported on the cam circumferential surface, the shift fork lever is provided with the torsion spring which provides the resetting force to move the head of the shift fork lever downward.

Positions of the cam having the largest radius and the smallest radius are circumferentially separated by 180°.

The drive motor is mounted in a mounting cover, the mounting cover is fixed on the deceleration clutch shell or a mounting plate, the mounting cover is formed by a hollow shell which accommodates the drive motor and is an irregular square shape. One side of the mounting cover is a mounting side wall, the mounting side wall is provided with an outwardly projecting mounting flange, the mounting flange is detachably connected to the deceleration clutch shell or the mounting plate via bolts.

A driving device for a deceleration clutch comprises a drive motor, a drive wheel, a shift fork lever, an axis of the drive wheel is perpendicular to an axis of a clutch sleeve, a bracing rod is eccentrically arranged on an end surface of the drive wheel perpendicular to the axis line, a head of the shift fork lever is a shift fork for controlling the clutch sleeve to move up and down, a tail of the shift fork lever is a drive end supported on the bracing rod. The drive wheel rotates and a height of the bracing rod changes in an axial direction of the clutch sleeve which drives a height of the drive end of the shift fork lever changes and drives a height of the shift fork changes, and further drives the clutch sleeve to move up and down.

An axis of a motor shaft of the drive motor is perpendicular to the axis of the clutch sleeve, the drive wheel comprises a cylindrical body. One end surface of the cylindrical body is directly mounted on the motor shaft of the drive motor and the other end surface is eccentrically provided with the bracing rod.

An end surface of the tail of the shift fork lever is provided with a concave straight trough, the trough is parallel to a rotation axis of the shift fork lever, the bracing rod extends into the trough of the shift fork lever.

An end of the bracing rod is provided with a rolling bearing, the rolling bearing sticks into the trough at the drive end of the shift fork lever.

A length of the trough is greater than twice an eccentricity of the bracing rod, a width of the trough is 1.05 to 1.2 times a diameter of an outer ring of the bracing rod or the rolling bearing.

The drive motor is fixed mounted on a deceleration clutch shell, or the drive motor is fixed mounted on a mounting plate of the deceleration clutch, preferably the drive motor is fixed mounted on the mounting plate of the deceleration clutch.

The shift fork lever is a lever structure and a fixed fulcrum is set in the middle part, preferably, the fixed fulcrum in the middle part of the shift fork lever is mounted on a fixed bracket to constitute a revolute joint, the fixing bracket is fixed on the deceleration clutch shell, or the fixed bracket is integrally provided with the deceleration clutch shell.

A first mounting hole is arranged at the middle of the shift fork lever, a second mounting hole is arranged at a corresponding position of the fixed bracket, the mounting holes are hinged by a rotary pin to form the fixed fulcrum of the shift fork lever, preferably, the fixed fulcrum is located at the middle of the shift fork lever and a side near the tail.

The drive motor is mounted in a mounting cover, the mounting cover is fixed on the deceleration clutch shell or a mounting plate, the mounting cover is formed by a hollow shell which accommodates the drive motor and is an irregular square shape. One side of the mounting cover is a mounting side wall, the mounting side wall is provided with an outwardly projecting mounting flange, the mounting flange is detachably connected to the deceleration clutch shell or the mounting plate via bolts.

The technical proposal of the disclosure brings the following beneficial effects:

1. The disclosure using the drive wheel to drive the shift fork which has the following characters: simple structure, simple operation, high reliability, smaller stroke, more compact structure, and less space occupied.

2. The drive wheel supporting surface and the shift fork contacts to drive the shift fork to operate reliably with low failure rate, and the drive wheel and the shift fork lever run smoothly in face contact during driving 3. The disclosure can control the movement of the shift fork by controlling the rotation of the drive wheel, and the control is simple 4. The drive motor is mounted on the deceleration clutch shell or the mounting plate which is mounted near the deceleration clutch shell, and the components are highly integrated. The drive motor is installed in the internal space of the mounting cover, which isolates the drive motor from the outside, prevents water droplets and water vapor from entering the drive motor, and reduces the chance of the drive motor being damaged by collision.

5. The disclosure can control the movement of the shift fork only by controlling the rotation of the drive wheel, the control is simple. The supporting slide rail can drive the two-way movement of the shift fork lever, and the reset spring can be canceled according to the design; the assembly process is simplified in the mass production and reduce the number of parts and costs.

6. The disclosure only controls the rotation of the drive wheel to realize the movement of the shift fork, the control is simple, the cam structure is simple and compact, and the design is convenient.

7. The disclosure can control the movement of the shift fork only by controlling the rotation of the drive wheel, the control is simple. The bracing rod can drive the two-way movement of the shift fork, and the reset spring can be canceled according to the design; the assembly process is simplified in the mass production and reduces the number of parts and costs.

Specific embodiments of the present disclosure are further described below in detail with reference to the accompanying drawings.

1. Drive motor, 2. Drive wheel, 3. Shift fork lever, 4. Cylindrical body, 5. Projection, 6. shift fork 7. Drive end, 8. First transition surface, 9. Highest supporting surface, 10. Second transition surface, 11. Arc wall, 12. Fixed bracket, 13. Shell, 14. Clutch sleeve, 15. Input shaft, 16. Input shaft sleeve, 17. Rotor, 18. Stator, 19. Third transition surface, 20. Highest contacting surface, 21. Fourth transition surface, 22. Groove, 26. Cam, 27. Bracing rod, 28. Trough, 30. Output shaft, 31. Output shaft sleeve, 32. Dewatering pan, 33. Clamping slot, 34. Rolling bearing.

DETAILED DESCRIPTION OF THE INVENTION

Figure 1:
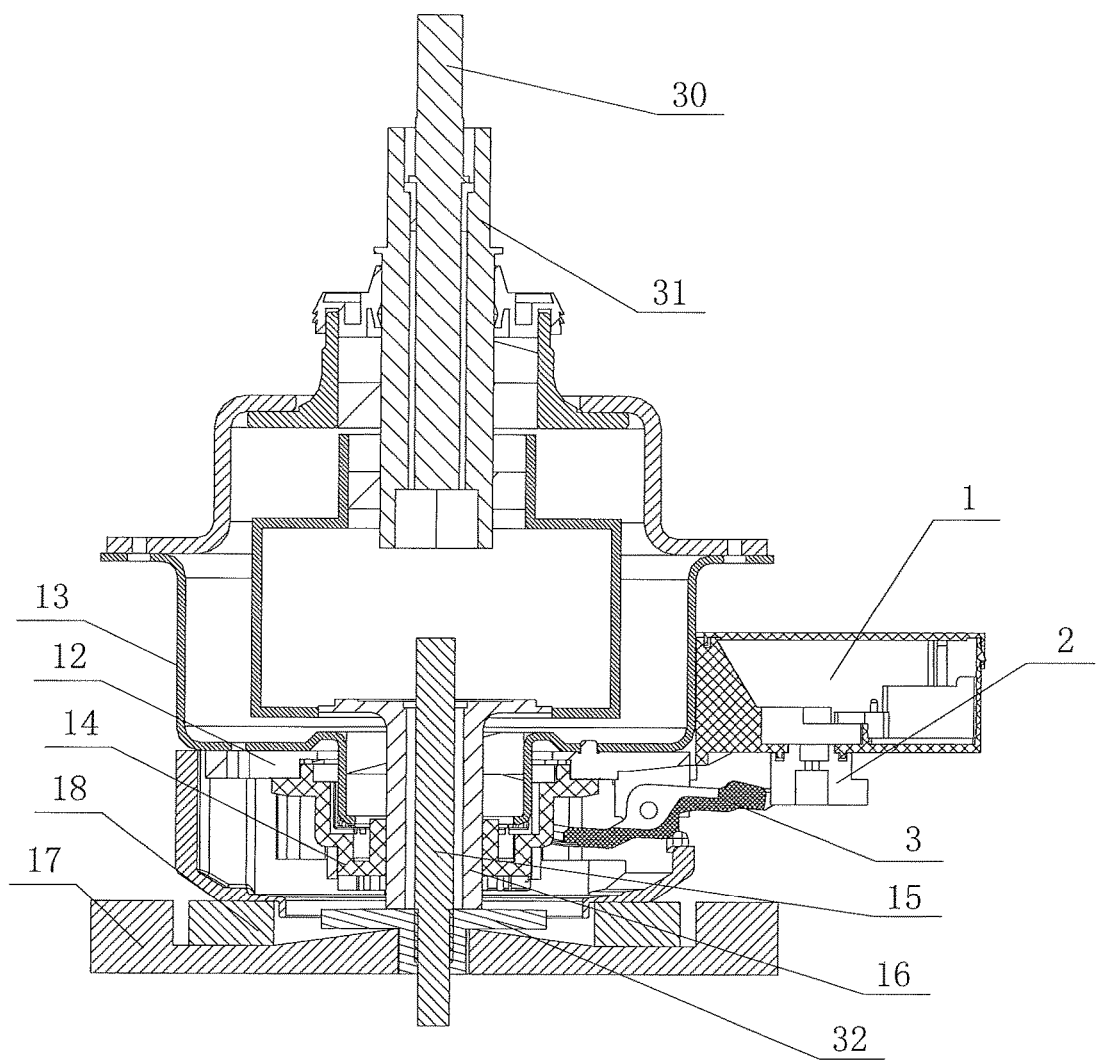
FIG. 1 is a sectional view of a assembly structure of a deceleration clutch the present disclosure.
Figure 2:
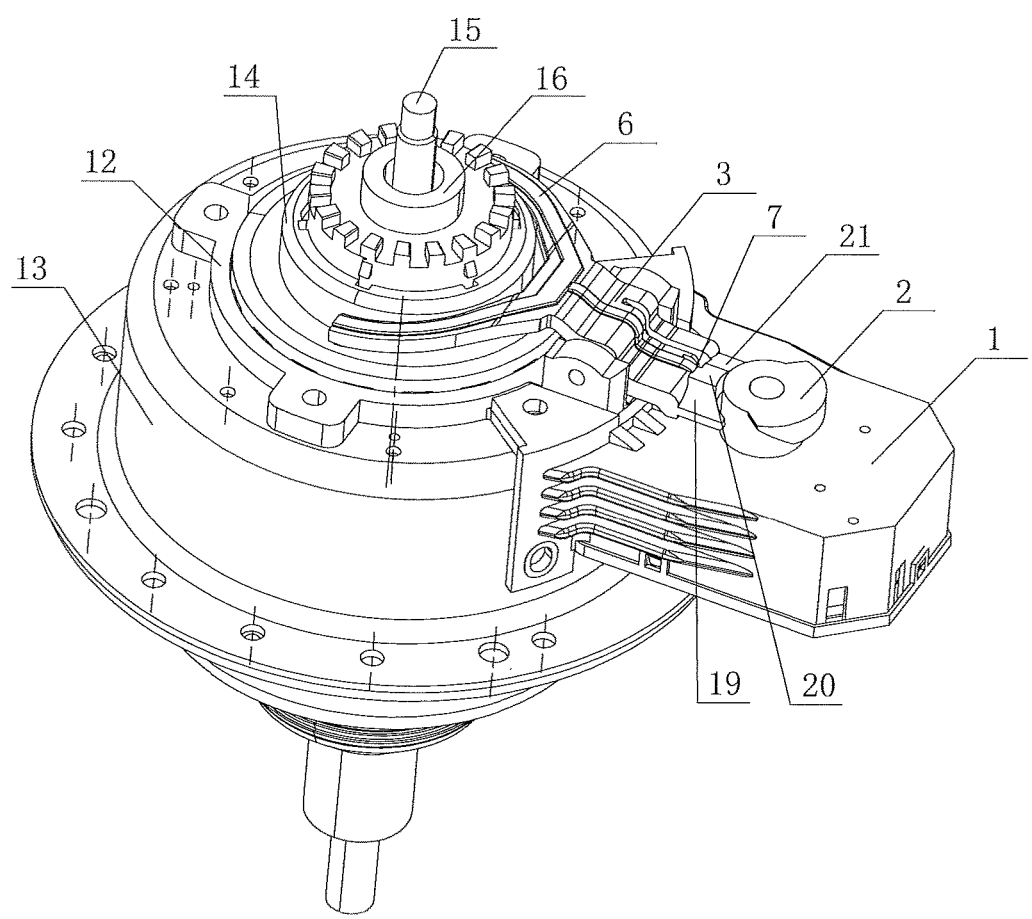
FIG. 2 is a schematic diagram of a assembly structure of a deceleration clutch the present disclosure.
Figure 3:
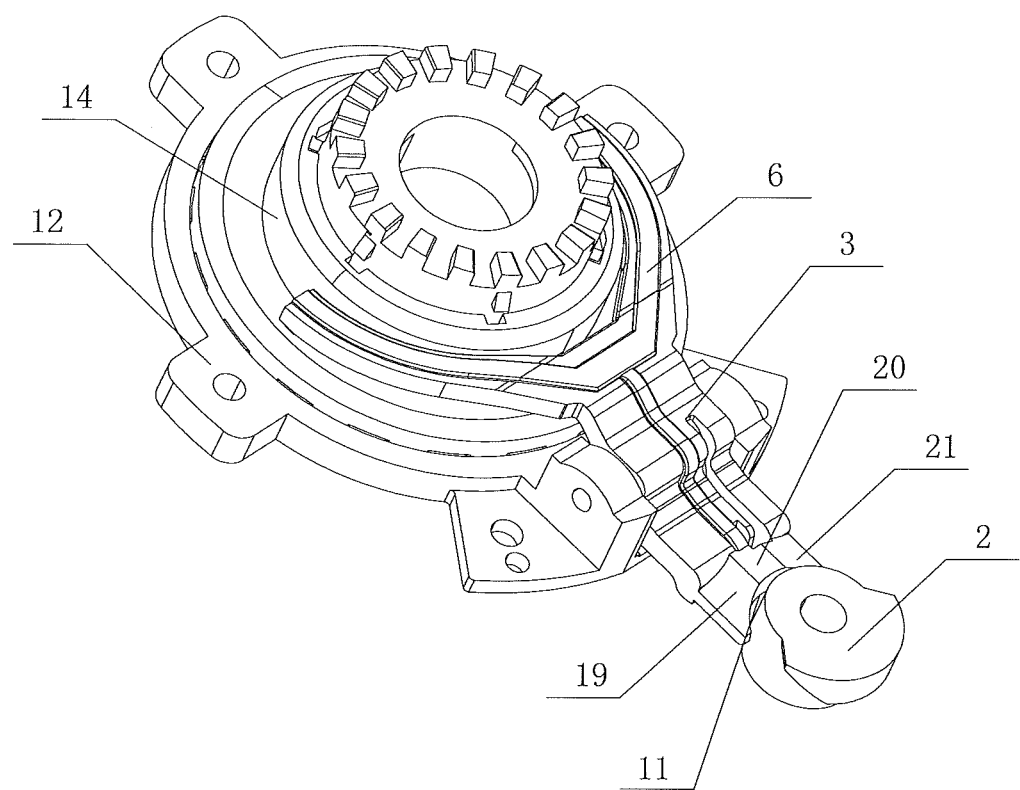
FIG. 3 is a schematic diagram of a clutch part of a deceleration clutch of the present disclosure.
Figure 4:
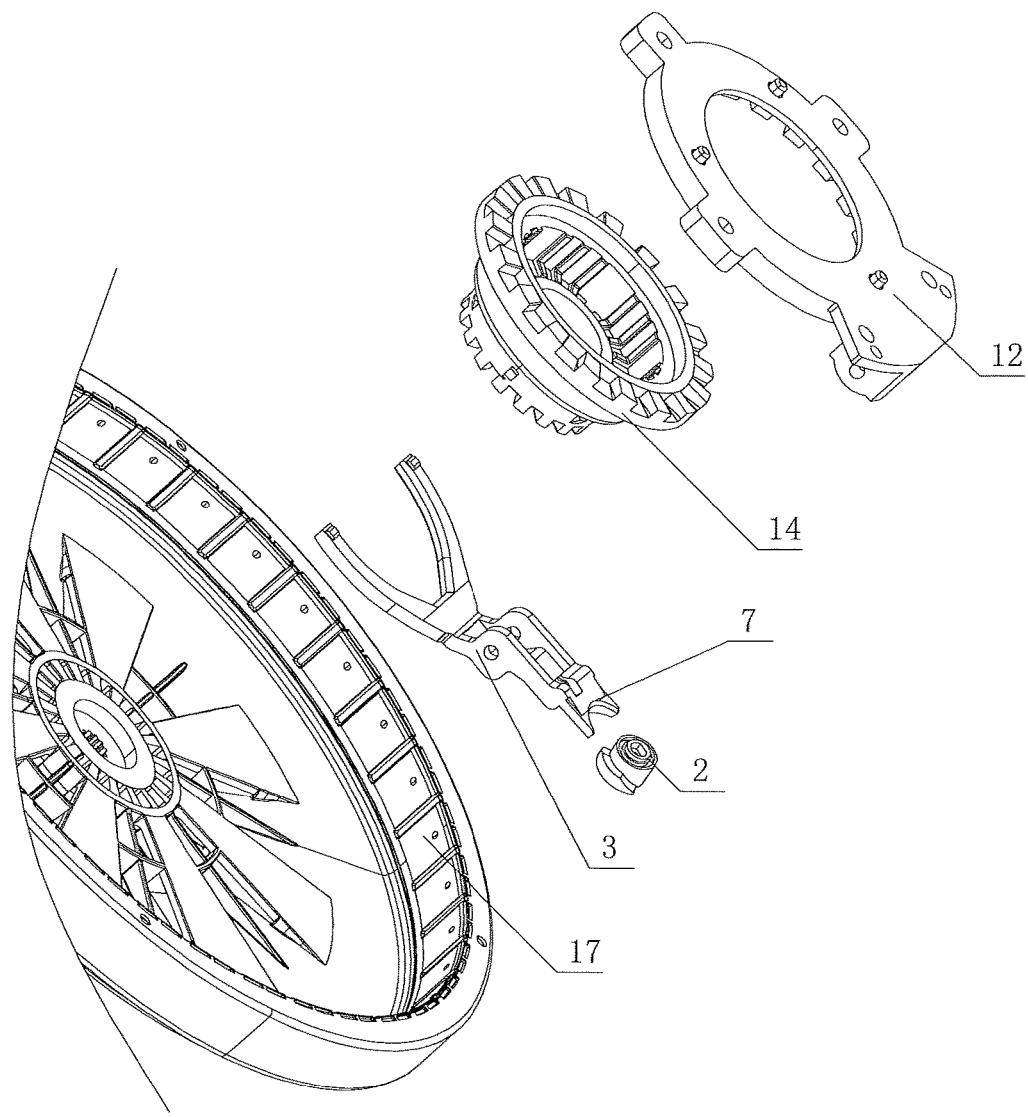
FIG. 4 is an explosive diagram of a clutch part of a deceleration clutch of the present disclosure.
Figure 5:
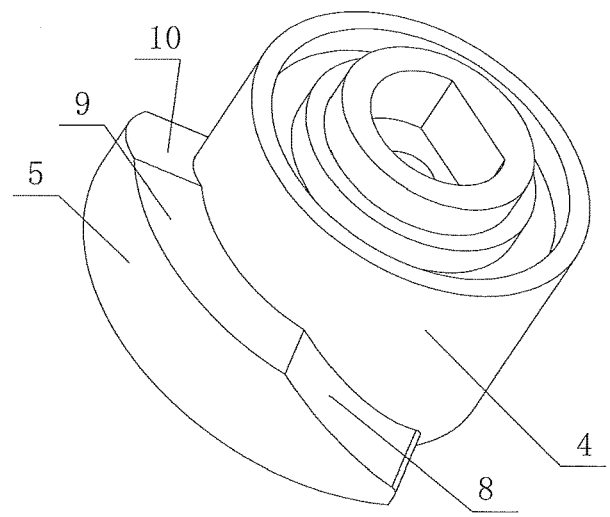
FIG. 5 is a schematic diagram of a drive wheel of the present disclosure.

The present disclosure relates to a clutch driving device for a deceleration clutch using in a washing machine. As shown in FIG. 1, the deceleration clutch comprises: an outer rotor motor composed of a rotor 17 and a stator 18, an input shaft 15 fixedly connected with the rotor 17, the input shaft 15 is axially rotatably mounted within an input shaft sleeve 16 via a bearing. A clutch sleeve 14 is provided between the deceleration clutch shell and the rotor 17. The clutch sleeve 14 is slidably mounted on the input shaft sleeve 16 in the axial direction and is not rotatable in the circumferential direction. A return spring is provided between the clutch sleeve 14 and a lower end of the deceleration clutch shell, and the clutch sleeve 14 is slidably moved between a first position and a second position under the action of the clutch driving device. An output shaft 30 is a pulsator shaft, and an output shaft sleeve 31 is a dehydration shaft.

When the clutch sleeve 14 is in the first position, the input shaft sleeve 16 is connected with and fixed relative with the lower end of the deceleration clutch shell via the clutch sleeve 14, this state is a washing state.

When the clutch sleeve 14 is in the second position, the rotor 17 drives the input shaft sleeve 16 to rotate by the clutch sleeve 14, this state is a dehydration state.

The clutch sleeve 14 is provided with a guide spline on its inner wall, the input shaft sleeve 16 is provided with a chute on the outer wall thereof, and the guide spline and the chute constitute a spline connection in which the clutch sleeve 14 and the input shaft sleeve 16 are axially slidable relative to each other and are not rotatable in the circumferential direction.

A fixed bracket 12 is fixedly mounted at the lower end of the deceleration clutch shell, the lower end of the fixed bracket 12 and the upper end of the clutch sleeve 14 are respectively provided with spline teeth. When the clutch sleeve 14 is in the first position, a spline connection is made to constitute a non-relative rotation of the fixed bracket 12 and the clutch sleeve 14.

A lower part of the clutch shaft sleeve 14 is extended with spline teeth, the rotor 17 or a dewatering pan 32 connected with the rotor 17 is provided with grooves or spline teeth which match with the axial splines provided at the lower part of the clutch sleeve 14. When the clutch sleeve 14 is in the second position, a spline connection is made which makes the clutch sleeve 14 and the rotor 17 unrotatable.

The lower end of the fixing bracket 12 and the clutch sleeve 14 are telescopically fixedly mounted with a return spring. The clutch sleeve 14 is connected with a clutch driving device, and the clutch sleeve 14 is switched between the first position and the second position by the clutch sleeve 14 slidingly up and down under the action of the clutch driving device. The clutch sleeve 14 is provided with a boss on an outer circumference, and the clutch driving device comprises at least one shift fork lever 3. The shift fork lever drives the boss to lift the clutch sleeve 14 upward. When the shift fork lever does not apply a biasing force to the boss, the clutch sleeve 14 is moved downward by the return spring and self-gravity.

Embodiment 1

As shown in from FIG. 2 to FIG. 5, a clutch driving device for a deceleration clutch of the present embodiment comprises a drive motor 1, a drive wheel 2 and a shift fork lever 3. The drive wheel 2 is arranged on a motor shaft of the drive motor 1, supporting faces with a height difference in the axial direction are arranged on the circumference of the drive wheel 2. The shift fork lever 3 is a lever structure and a fixed fulcrum is set in the middle part; a head of the shift fork lever 3 is a shift fork 6. The shift fork 6 is located below a clutch sleeve 14, together with a return spring controls the vertical movement of the clutch sleeve 14. A tail of the shift fork lever 3 is a drive end 7, slide contacting surfaces are provided on the drive end 7 for sliding engagement with supporting surfaces. The drive motor 1 drives the drive wheel 2 to rotate, the drive end 7 of the shift fork lever relatively slides on the supporting surfaces, so that a height of the drive end 7 of the shift fork lever 3 changes, which drives a height of the shift fork 6 of the shift fork lever changes, the head shift fork 6 together with the return spring drive the clutch sleeve 14 to move up and down. The drive wheel 2 is directly arranged on the motor shaft of the drive motor 1, an axis of the drive wheel 2 is parallel with an axis line of the clutch sleeve 14. The drive wheel 2 is stationary in the axial direction and turns in the circumferential direction and the shift fork lever 3 is stationary in the circumferential direction. When the drive wheel 2 rotates in the circumferential direction, the height of the drive end 7 of the shift fork lever 3 that supported on the supporting surface of the drive wheel 2 changes in accordance with the height of the clutch sleeve changes in the axial direction when the supporting surfaces rotate. A height of the drive end 7 of the shift fork lever 3 changes, which drives a height of the shift fork 6 of the shift fork lever 3 to change accordingly and further drives the clutch sleeve 14 to move. This kind of clutch driving device has the advantages of simple structure, high driving reliability, easy installation, high integration degree of modules.

The driving motor is a stepping motor, and a pulse signal is provided to drive the motor shaft through 180°, the drive end 7 of the shift fork lever 3 is moved from an uppermost position to a lowermost position or from the lowermost position to the uppermost position. The drive motor rotates 180° again, the drive end 7 of the shift fork lever 3 is moved from the lowermost position to the uppermost position or from the uppermost position to the lowermost position.

The clutch sleeve 14 is driven to move up and down along the input shaft sleeve 16 by the shift fork 6 and the return spring. Spline teeth at the lower end of the clutch sleeve 14 are engaged with spline teeth on the motor rotor 17 when moving to the lowermost position, the input shaft 15 and the input shaft sleeve 16 rotate in the same direction at the same speed to drive the pulsator shaft and the dehydration shaft to rotate in the same direction at the same speed as a dehydration state. When the clutch sleeve 14 moves to the uppermost position, spline teeth on the upper end engage with the spline teeth on the deceleration clutch shell or the fixed bracket 12, and the input sleeve 16 can't rotate in the circumferential direction. The input shaft 15 is rotated by the deceleration clutch to drive the pulsator shaft and the dehydration shaft in the reverse direction to form a double power wash or the dehydration shaft does not rotate and pulsator shaft rotates to form an ordinary full automatic washing, which depends on the setting of the gear train inside the deceleration clutch as a washing state.

The drive wheel comprises a cylindrical body 4 in the present embodiment, and at least a portion of the circumferential surface of the cylindrical body extends radially outwardly to form an arcuate projection 5. One surface in the axial direction of the projection 5 is a supporting surface. The supporting surface comprises an inclined first transition surface 8, a highest supporting surface 9, and a second transition surface 10 inclining inversely with respect to the first transition surface 8 which are sequentially connected in the circumferential direction.

An end surface of the drive end 7 of the shift fork lever 3 is an arc wall, and the arc wall correspondingly matches with the cylindrical body of the drive wheel, which can assist in limiting rotation of the shift fork lever in the circumferential direction. The operation process is more stable and reduces the impact on connectors. If the end of the shift fork lever 3 does not have the arc wall, the supporting surface and one side of the drive end of the shift fork are slid relative to each other when the drive wheel 2 rotates. The shift fork lever has a trend to be driven to move following the supporting surface due to a friction, which will have an impact on connectors of the fixed part of the shift fork lever. Thus the connector is prone to damage, resulting in deceleration clutch failure.

One side of the drive end 3 of the shift fork lever and the supporting surface of the drive wheel are in contact. The contacting surface comprises an inclined third transition surface 19, a highest contacting surface 20, and a fourth transition surface 21 inclining inversely with respect to the third transition surface 19, which are sequentially connected in the circumferential direction. The highest supporting surface 19 and the highest contacting surface 20 are in surface contact, which can avoid the damage caused by the stress concentration on the contact part and improve the service life of components.

Alternatively, a portion of the circumferential surface of the end portion of the drive wheel 2 extends radially outwardly to form the projection 5, and the other circumferential surface is a circumferential surface of the cylindrical body 4. Preferably, ⅓ to ⅔ of the entire circumference of the end portion of the drive wheel 2 extend radially outward to form the projection 5, the other circumferential surface is a circumferential surface of the cylindrical body. When the supporting surface of the projection 5 and the drive end 7 of the shift fork lever 3 are in contact, the shift fork lever moves. When the drive wheel 2 is turned to the side of the drive end of the shift fork lever 3 and disengages with the supporting surface of the projection 5, and only the arc wall of the drive end and the cylindrical surface of the cylindrical body 4 are in contact, the projection is not limiting the up and down movement of the shift fork lever. The shift fork lever backs to original position by the return spring at this time.

½ of the circumferential surface of the end portion of the drive wheel 2 extends radially outwardly to faun the projection 5, the other ½ circumferential surface is a circumferential surface of the cylindrical body 4. Or ⅓ of the circumferential surface of the end portion of the drive wheel extends radially outwardly to form the projection, the other ⅔ circumferential surface is a circumferential surface of the cylindrical body. Or ⅔ of the circumferential surface of the end portion of the drive wheel extends radially outwardly to form the projection, the other ⅓ circumferential surface is a circumferential surface of the cylindrical body.

Alternatively, the entire circumferential surface of the end portion of the drive wheel extends radially outwardly to form a projection, and the projection comprises a highest supporting surface and a lowest supporting surface. The highest supporting surface and the lowest supporting surface are circumferential spaced by 180°, the transition between the highest supporting surface and the lowest supporting surface is oblique. In this case, the return spring of the shift fork lever always functions.

The shift fork lever 3 is a lever structure and a fixed fulcrum is set in the middle part. The middle part of the shift fork lever 3 is mounted on a fixed bracket 12 to constitute a revolute joint. The fixing bracket 12 is fixed on the deceleration clutch shell 13, or the fixed bracket 12 is integrally provided with the deceleration clutch shell 13. Preferably, the fixing bracket 12 is fixed on the deceleration clutch shell 13. It is only necessary to replace the fixing bracket 12 after the failure of the hinged position between the fixing bracket 12 and the shift lever 3 without replacing the whole deceleration clutch shell 13.

A first mounting hole is arranged at the middle of the shift fork lever 3, a second mounting hole is arranged at a corresponding position of the fixed bracket, and the mounting holes are hinged by a rotary pin to form the fixed fulcrum of the shift fork lever 3. A torsion spring for providing a resetting force to the shift fork lever is further provided on the rotary pin, the torsion spring is the return spring of the shift fork lever. Preferably, the fixed fulcrum is located at the middle of the shift fork lever and a side near the tail. So that the movement of the smaller stroke of the drive end 7 results in a larger stroke of movement of the head.

An axial upper surface of the projection 5 of the drive wheel 2 is the supporting surface, a lower surface of the drive end 7 of the shift fork lever 3 is the contacting surface in contact with the supporting surface; the supporting surface comprises the upwardly inclined first transition surface 8, the highest supporting surface 9 and the downwardly inclined second transition surface 10; the contacting surface comprises the downwardly inclined third transition surface 19, the highest contacting surface 20 and the upwardly inclined fourth transition surface 21.

When the drive wheel 2 rotates to bring the clutch sleeve 14 to the second position, the highest support surface 9 pushes up the drive end 7 of the tail portion of the shift fork lever 3, and the shift fork 6 of the shift fork lever is moved downwardly. The axial limit action of the drive wheel against the clutch sleeve 14 is lost and the clutch sleeve 14 moves downwardly under the action of the return spring and the force of gravity. When the drive wheel rotates 180 degrees, the drive wheel 2 rotates to bring the clutch sleeve 14 to the first position, the return spring is in the compressed state, and the drive end of the tail portion of the shift fork lever is in a free state. Or the lowest supporting surface and the highest contacting surface are in contact, the drive end 7 of the tail portion moves downward and the shift fork moves upward under the action of the torsion spring. The shift fork 6 of the shift fork lever 3 lift the clutch sleeve 14 up.

The axial lower surface of the projection of the drive wheel is the supporting surface, an upper surface of the drive end of the shift fork lever is the contacting surface in contact with the supporting surface. The supporting surface comprises the downwardly inclined first transition surface 8, the highest supporting surface 9 and the upwardly inclined second transition surface 10, and the contacting surface comprises the upwardly inclined third transition surface 19, the highest contacting surface 20 and the downwardly inclined fourth transition surface 21.

The highest supporting surface 9 presses down the drive end 7 of the shift fork lever 3, the shift fork of the shift fork lever 3 moves upward, which lift up the clutch sleeve 14 along the drive wheel 2 rotates. When the drive wheel 2 rotates 180 degrees, the drive end 7 of the shift fork lever 3 only has the arc wall to cooperate with the drive wheel, and the drive end 7 of the shift fork lever in the axial direction is in a free state. Or the lowest supporting surface and the highest contacting surface are in contact, the drive end 7 of the tail portion moves upward and the shift fork moves downward under the action of the torsion spring. The clutch sleeve 14 moves downward under the action of the return spring and the force of gravity Embodiment 2

Figure 6:
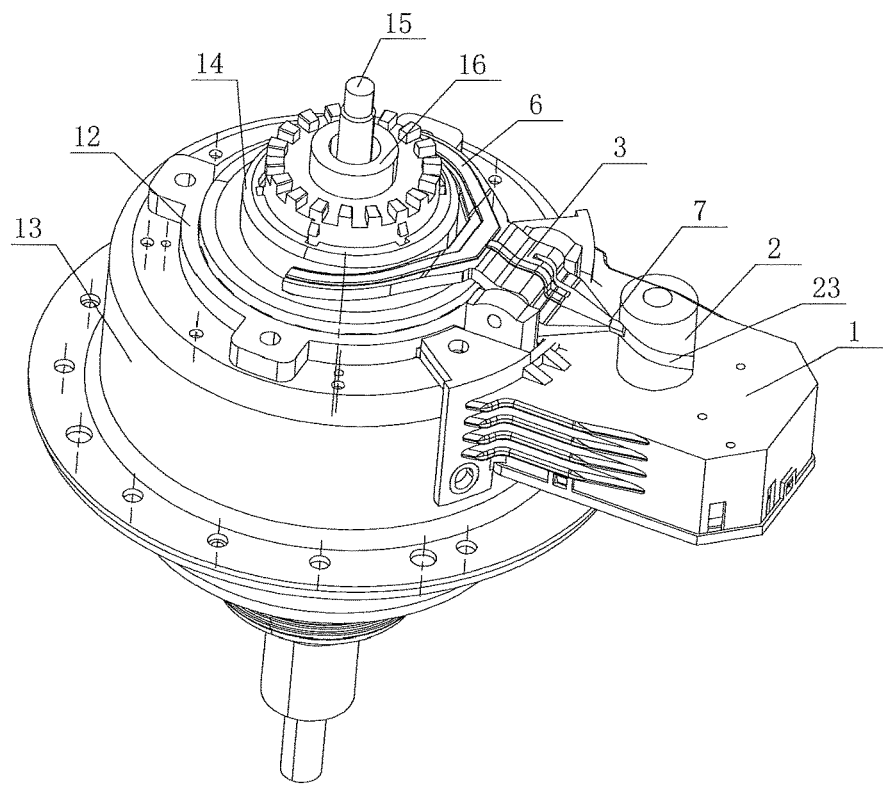
FIG. 6 is a schematic diagram of a clutch part of a deceleration clutch in one embodiment of the present disclosure.
Figure 7:
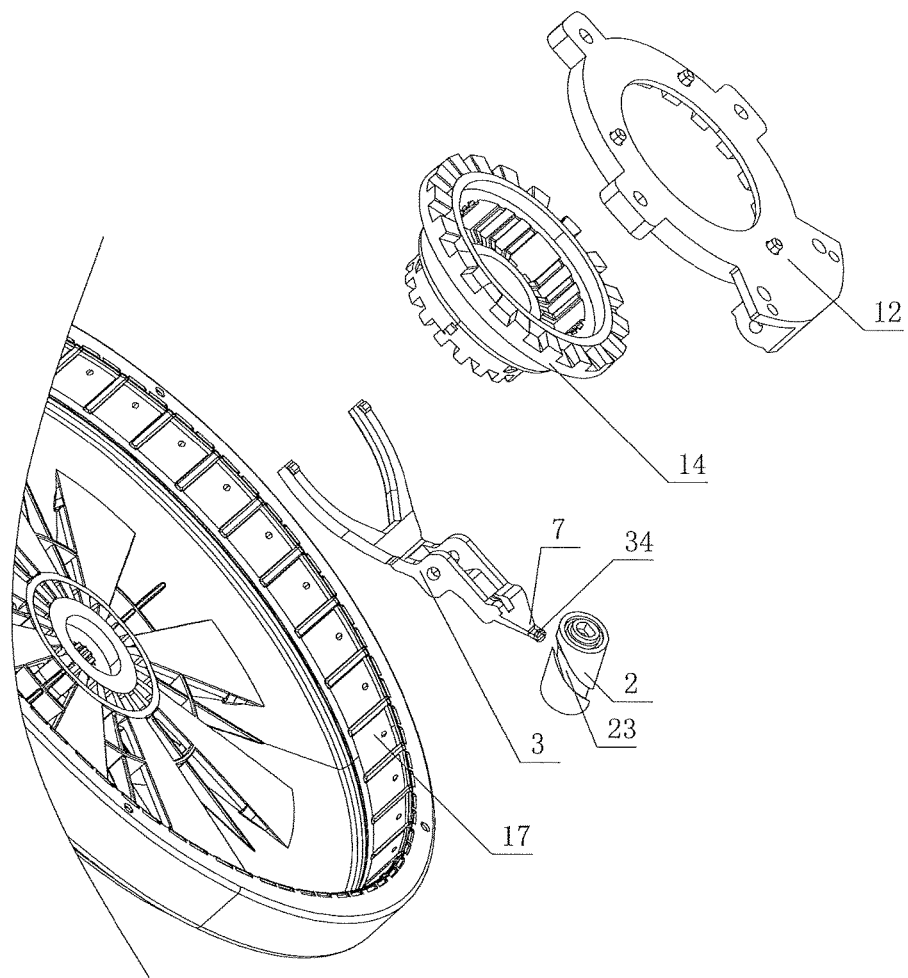
FIG. 7 is an explosive diagram of a clutch part of a deceleration clutch in one embodiment of the present disclosure.

As shown in FIG. 6 and FIG. 7, a driving device for a deceleration clutch of the present embodiment comprises a drive motor 1, a drive wheel 2, a shift fork lever 3, the drive wheel 2 is directly mounted on a motor shaft of the drive motor 1, the drive wheel 2 axis is parallel to the axis of a clutch sleeve 14, the drive wheel 2 is provided with a supporting slide rail with a height difference in the axial direction. The shift fork lever 3 is a lever structure and a fixed fulcrum is set in the middle part, a head portion of the shift fork lever 3 is a shift fork 6, the shift fork 6 is below the clutch sleeve 14. The shift fork lever together with a return spring controls the up and down movement of the clutch sleeve 14. The tail portion of the shift fork lever 3 is a drive end 7, the drive end 7 is provided with a slide contacting surface which is supported in the supporting slide rail. The drive motor drives the drive wheel to rotate, the slide contacting surface of the drive end 7 of the shift fork lever 3 relatively slides in the supporting slide rail and the height of the tail portion of the shift fork lever changes, which drives a height of the shift fork 6 of the shift fork lever 3 changes. The shift fork 6 and the return spring together drive the clutch sleeve 14 to move up and down.

The clutch sleeve 14 is driven to move up and down along the input shaft sleeve 16 by the fork 6 and the return spring. Spline teeth at the lower end of the clutch sleeve 14 are engaged with spline teeth on the motor rotor 17 when moving to the lowermost position, the input shaft 15 and the input shaft sleeve 16 rotate in the same direction at the same speed to drive the pulsator shaft and the dehydration shaft to rotate in the same direction at the same speed as a dehydration state. When the clutch sleeve 14 moves to the uppermost position, spline teeth on the upper end engage with the spline teeth on the deceleration clutch shell or the fixed bracket 12, and the input sleeve 16 can't rotate in the circumferential direction. The input shaft 15 is rotated by the deceleration clutch to drive the pulsator shaft and the dehydration shaft in the reverse direction to form a double power wash, or the dehydration shaft does not rotate and pulsator shaft rotates to faun an ordinary full automatic washing, which depends on the setting of the gear train inside the deceleration clutch as a washing state.

The drive wheel 2 is directly installed on a motor shaft of the drive motor 1, an axis of the drive wheel 2 and an axis of the clutch sleeve 14 are parallel with each other. The drive wheel 2 is axially stationary and rotating in a circumferential direction, the shift fork lever 3 is circumferential stationary. When the drive wheel 2 rotates in the circumferential direction, a height of the drive end 7 of the shift fork lever 3 which is supported in the supporting slide rail of the drive wheel 2 changes along with the change of a height in the axial direction when the supporting slide rail rotates. The height of the drive end 7 of the shift fork lever 3 changes, which drives the height of the shift fork 6 of the shift fork lever 3 changes and further drives the clutch sleeve 14 to move. This kind of clutch driving device has the advantages of simple structure, high driving reliability, easy installation, high integration degree of modules.

The drive wheel 2 comprises a cylindrical body 4, the cylindrical body 4 is radially inwardly recessed on the circumferential surface to form a circle of an axial height-gradient groove 23 which is the supporting slide rail. A height of the supporting slide rail is changed smoothly in the axial direction. The supporting slide rail comprises a lowest supporting surface, an inclined first transition surface, a highest supporting surface and a second transition surface inclining inversely with respect to the first transition surface, which are sequentially connected in the circumferential direction, and connection of each surface has smooth transition. When the drive wheel 2 rotates, the drive end 7 of the shift fork lever 3 is in the supporting slide rail, a height in an axial direction of the drive end 7 of the shift fork lever 3 changes along with a height in an axial direction of the supporting slide rail.

The highest support surface and the lowest support surface are circumferentially spaced by 180°. The driving motor is a stepping motor, and a pulse signal is provided to drive the motor shaft through 180°. The drive end 7 of the shift fork lever 3 moves from an uppermost position to a lowermost position, or from the lowermost position to the uppermost position. The drive motor rotates 180° again, the drive end 7 of the shift fork lever 3 moves from the lowermost position to the uppermost position, or from the uppermost position to the lowermost position. The angle of rotation of the drive motor 1 is the same every time the state changes. But it is also possible to set the angle of rotation of the drive motor 1 at different angles, except that the angle of each rotation of the drive motor is different.

The drive end 7 of the shift fork lever 3 is sticking into the supporting slide rail of the drive wheel. The tail portion of the shift fork lever at least comprises a first surface in contact with the lowest supporting surface and a second surface in contact with the highest supporting surface. And the lowest support surface is in surface contact with the first surface, the highest support surface being in surface contact with the second surface. It can avoid the damage caused by the stress concentration on the contact part and improve the service life of components.

The drive end 7 of the shift fork lever 3 is provided with a rolling bearing 34 which extends into the supporting slide rail of the drive wheel. So that the drive end 7 and the supporting slide rail can be smoothly connected. The arrangement of the rolling bearing 34 can also reduce the block and wear, and the movement is flexible, An axis of a motor shaft of the drive motor 1 is parallel to an axis of the clutch sleeve 14. The drive motor 1 is mounted on a deceleration clutch shell 13, or the drive motor is mounted on a mounting plate of the deceleration clutch (This scenario is not shown in Figs). Compared with the prior art, in which the traction motor is mounted on the bottom of the outer tub, the drive motor 1 of the disclosure is installed on the deceleration clutch shell or the mounting plate of the deceleration clutch, and has compact structure and small occupying space.

The shift fork lever 3 is a lever structure and a fixed fulcrum is set in the middle part, the middle part of the shift fork lever 3 is mounted on a fixed bracket 12 to constitute a revolute joint, the fixing bracket 12 is fixed on the deceleration clutch shell 13, or the fixed bracket 12 is integrally provided with the deceleration clutch shell 13. Preferably, the fixing bracket 12 is fixed on the deceleration clutch shell 13. It is only necessary to replace the fixing bracket 12 after the failure of the hinged position between the fixing bracket 12 and the shift lever 3 without replacing the whole deceleration clutch shell 13.

A first mounting hole is arranged at the middle of the shift fork lever 3, a second mounting hole is arranged at a corresponding position of the fixed bracket, and the mounting holes are hinged by a rotary pin to form the fixed fulcrum of the shift fork lever 3. Preferably, the fixed fulcrum is located at the middle of the shift fork lever 3 and a side near the drive end 7. So that the movement of the smaller stroke of the drive end 7 results in a larger stroke of movement of the head.

The shift fork lever 3 of the present embodiment doesn't need to set a return spring, the groove of the drive wheel can drive the upper and lower side of the drive end 7 of the shift fork lever 3. The groove of the drive wheel can drive the drive end 7 of the shift fork lever 3 to move up and down. It can save a part structure, simplify the process of one-step assembly, saving material costs.

An end surface of the drive end 7 of the shift fork lever 3 is an arc wall, the arc wall cooperates with the cylindrical body 4 of the drive wheel. A middle part of the arc wall extends perpendicularly to the arc wall and extends into the supporting slide rail of the drive wheel 2, and is movably connected with the supporting slide rail. The operation process is more stable, reduces the impact on the connector. If the end of the shift fork lever 3 does not have the arc wall, the supporting surface and one side of the drive end of the shift fork are slid relative to each other when the drive wheel 2 rotates. The shift fork has a trend to be driven to move following the supporting surface due to a friction, which has an impact on connectors of the fixed part of the shift fork lever, the connector is prone to damage, resulting in deceleration clutch failure.

The drive wheel 2 rotates and the drive end 7 of the shift fork lever 3 relatively slides to the groove of the drive wheel 2. The highest supporting 9 lifts up the drive end 7 of the shift fork lever 3, the shift fork 6 of the shift fork lever moves downwards and far away from a boss of the clutch sleeve 14, and the limit action in the axial direction of the clutch sleeve 14 disappears. The clutch sleeve 14 moves downward under the action of the return spring and the force of gravity. The drive wheel rotates by 180 degrees and the lowest supporting surface presses the drive end 7 of the shift fork lever 3 downwardly, and the shift fork moves upwards, and the shift fork 6 of the shift fork lever 3 pulls the clutch sleeve 14 upwards. Complete the position state switch.

Embodiment 3

Figure 8:
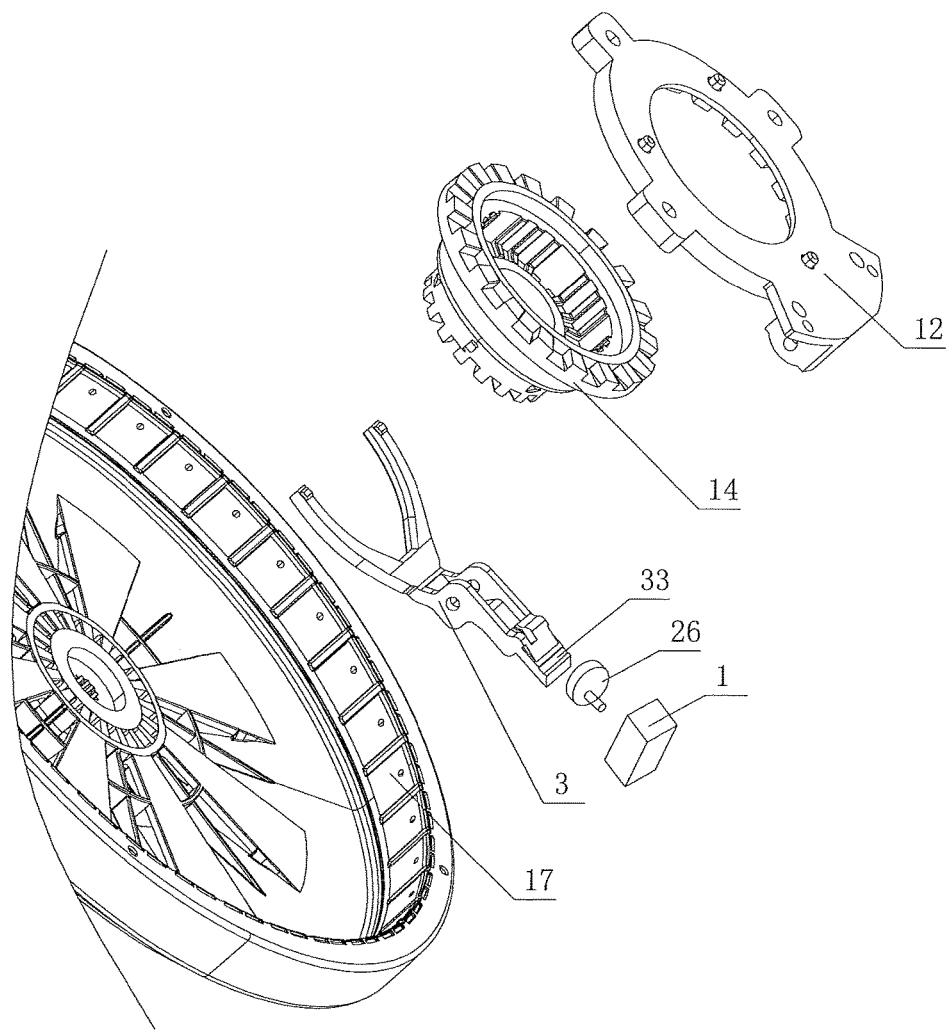
FIG. 8 is an explosive diagram of a clutch part of a deceleration clutch in one embodiment of the present disclosure.
Figure 9:
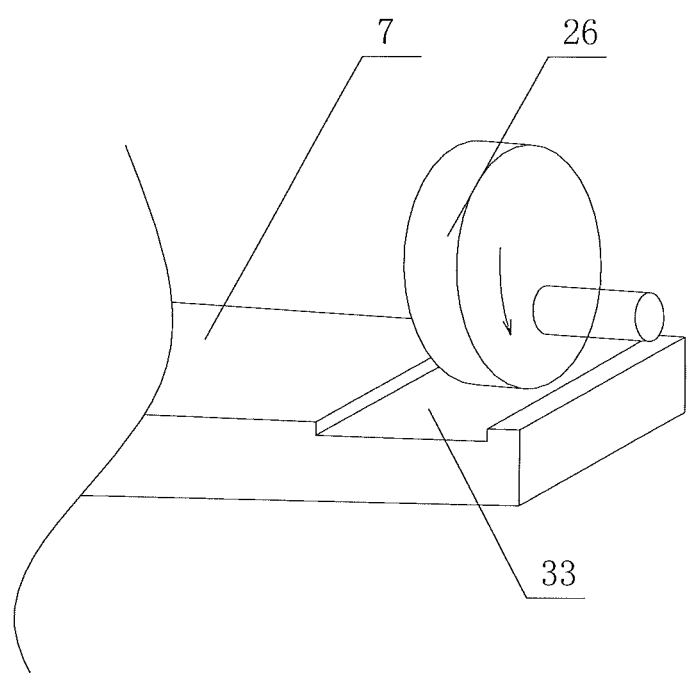
FIG. 9 is a diagram of a drive end of a shift fork lever of a clutch part of a deceleration clutch in one embodiment of the present disclosure.

As shown in FIG. 8 and FIG. 9, a driving device for a deceleration clutch of the present embodiment comprises a drive motor 1, a drive wheel 2, and a shift fork lever 3. The shift fork lever 3 is a lever structure and a fixed fulcrum is set in the middle part. A head of the shift fork lever 3 is a shift fork 6. The shift fork 6 is located below a clutch sleeve 14 together with a return spring to control the vertical movement of the clutch sleeve 14. A tail of the shift fork lever is a drive end 7 which is connected with the drive wheel 2. An axis of the drive wheel is perpendicular to an axis of a clutch sleeve. The drive wheel is a cam structure, and the cam circumference is radially gradient. The tail portion of the shift fork lever is supported on a cam circumferential surface, the drive motor drives the cam to rotate. The tail portion of the shift fork lever is in contact with the circumference of different radius of the cam, a height changes, which drives a height of the shift fork of the shift fork lever to change. The shift fork 6 and the return spring work together to move the clutch sleeve 14 up and down.

The clutch sleeve 14 is driven to move up and down along the input shaft sleeve 16 by the shaft fork 6 and the return spring. Spline teeth at the lower end of the clutch sleeve 14 are engaged with spline teeth on the motor rotor 17 when moving to the lowermost position, the input shaft 15 and the input shaft sleeve 16 rotate in the same direction at the same speed to drive the pulsator shaft and the dehydration shaft to rotate in the same direction at the same speed as a dehydration state. When the clutch sleeve 14 moves to the uppermost position, spline teeth on the upper end engage with the spline teeth on the deceleration clutch shell or the fixed bracket 12, and the input sleeve 16 can't rotate in the circumferential direction. The input shaft 15 is rotated by the deceleration clutch to drive the pulsator shaft and the dehydration shaft in the reverse direction to form a double power wash, or the dehydration shaft does not rotate and pulsator shaft rotates to form an ordinary full automatic washing, which depends on the setting of the gear train inside the deceleration clutch as a washing state.

The cam 26 is directly mounted on a motor shaft of the drive motor 1, an axis of the motor shaft of the drive motor 1 is perpendicular to an axis of the clutch sleeve 14. The cam is axially stationary and moves in the circumferential direction. The shift fork lever 3 is stationary in the circumferential direction. When the cam rotates in the circumferential direction, a height of the drive end 7 of the shift fork lever 3 which is supported on the e cam 26 circumferential surface changes along with the change of the radius of the cam 26. The height of the drive end 7 of the shift fork lever 3 changes, which drives a height of the shift fork 6 of the shift fork lever 3 changes and further drives the clutch sleeve 14 to move. This kind of clutch driving device has the advantages of simple structure, high driving reliability, easy installation, high integration degree of modules. The cam drive mode has a compact structure and high reliability.

The drive motor 1 is mounted on a deceleration clutch shell 13 or the drive motor is mounted on a mounting plate of the deceleration clutch. Preferably, the drive motor is mounted on the mounting plate of the deceleration clutch. Compared with the prior art, in which the traction motor is mounted on the bottom of the outer tub, the drive motor 1 of the disclosure is mounted on the mounting plate of the deceleration clutch, and the deceleration clutch has compact structure and small occupying space.

An upper side or a lower side surface of the drive end 7 of the shift fork lever 3 is in contact with the cam 26 circumferential surface, the side surface of the tail of the shift fork lever 3 being in contact with the of the cam 26 circumference surface is concave corresponding to a position of the cam circumferential surface to form a clamping slot 33, or two ends of the side surface of the tail of the shift fork lever 3 being in contact with the cam 26 circumference surface are convex corresponding to a position of the cam circumferential surface to from a clamping slot. It can assist in limiting the movement of the cam 26 in the axial direction.

The shift fork lever 3 is a lever structure and a fixed fulcrum is set in the middle part, the middle part of the shift fork lever 3 is mounted on a fixed bracket 12 to constitute a revolute joint. The fixing bracket 12 is fixed on a deceleration clutch shell 13, or the fixed bracket 12 is integrally provided with the deceleration clutch shell 13. Preferably, the fixing bracket 12 is fixed on a deceleration clutch shell 13. It is only necessary to replace the fixing bracket 12 after the failure of the hinged position between the fixing bracket 12 and the shift lever 3 without replacing the whole deceleration clutch shell 13.

A first mounting hole is arranged at the middle of the shift fork lever 3, a second mounting hole is arranged at a corresponding position of the fixed bracket, the mounting holes are hinged by a rotary pin to form the fixed fulcrum of the shift fork lever 3. A torsion spring for providing a resetting force to the shift fork lever is further provided on the rotary pin, the torsion spring is the return spring of the shift fork lever. Preferably, the fixed fulcrum is located at the middle of the shift fork lever 3 and a side near the drive end 7. So that the movement of the smaller stroke of the drive end 7 results in a larger stroke of movement of the head.

The cam 26 is located below the drive end 7 of the shift fork lever 3. The lower side surface of the drive end 7 of the shift fork lever 3 is provided with a clamping slot which is supported on the cam circumferential surface. The shift fork lever is provided with a torsion spring that provides a reset force for moving the head portion of the shift fork lever upward.

The radius of the circumferential surface of the cam 26, which is in contact with the drive end 7 of the shift fork lever 3, is gradually increased when the cam 26 rotates. The cam drives the drive end 7 of the shift fork lever 3 of press downwardly, and the shift fork of the shift fork lever 3 is moved upward to raise the clutch sleeve 14 to the maximum radius peripheral surface of the cam 26. The radius of the cam 26 circumferential surface, which is in contact with the drive end 7 of the shift fork lever 3, is gradually reduced when the cam continually rotates. The cam is gradually moved away from the drive end 7 of the shift fork lever 3 and the restraining action on the drive end 7 of the shift fork lever 3 gradually disappears. The shift fork lever 3 is moved by its own torsion spring so that the drive end 7 is moved upward and the head portion is moved downwardly, and the clutch sleeve 14 moves downward under the action of the return spring and the gravity.

The cam 26 is located above the drive end 7 of the shift fork lever 3. The upper side surface of the drive end 7 of the shift fork lever 3 is provided with a clamping slot which is supported on the cam circumferential surface. The shift fork lever is provided with a torsion spring that provides a reset force for moving the head portion of the shift fork lever downward.

The radius of the cam 26 circumferential surface, which is in contact with the drive end 7 of the shift fork lever 3, is gradually increased when the cam 26 rotates. The cam drives the drive end 7 of the shift fork lever 3 upwardly, and the shift fork of the shift fork lever 3 is moved downward and far away from the boss of the clutch sleeve 14. The limit action in the axial direction of the clutch sleeve 14 disappears. The clutch sleeve 14 moves down under the action of the return spring and gravity until the maximum radius of the circumference surface of the cam 26. The radius of the cam 26 circumferential surface, which is in contact with the drive end 7 of the shift fork lever 3, is gradually reduced when the cam continually rotates. The cam is gradually moved away from the drive end 7 of the shift fork lever 3 and the limit action on the drive end 7 of the shift fork lever 3 gradually disappears. The shift fork lever 3 is moved by its own torsion spring so that the drive end 7 is moved downward and the head portion is moved upwardly to raise the clutch sleeve 14 until the maximum radius peripheral surface of the cam 26.

Positions of the cam having the largest radius and the smallest radius are circumferentially separated by 180°. The driving motor is a stepping motor, and a pulse signal is provided to drive the motor shaft through 180°. The drive end 7 of the shift fork lever 3 is moved from an uppermost position to a lowermost position or from the lowermost position to the uppermost position. The drive motor rotates 180° again, the drive end 7 of the shift fork lever 3 is moved from the lowermost position to the uppermost position or from the uppermost position to the lowermost position. The cam 26 drives the drive end 7 of the shift fork lever 3 to move in one direction and the other direction is effected by the return spring of the shift fork lever. The angle of rotation of the drive motor 1 is the same every time the state changes, but it is also possible to set the angle of rotation of the drive motor 1 at different angles, except that the angle of each rotation of the drive motor is different.

Embodiment 4

Figure 10:
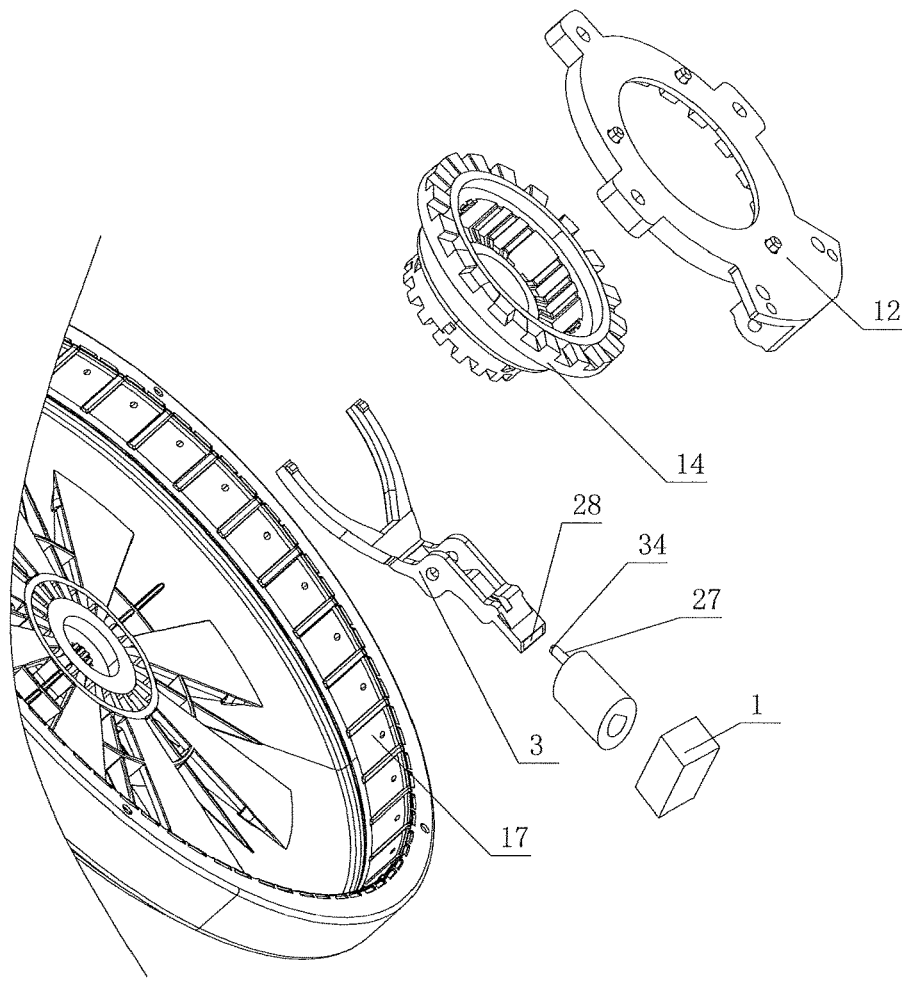
FIG. 10 is an explosive diagram of a clutch part of a deceleration clutch in one embodiment of the present disclosure.
Figure 11:
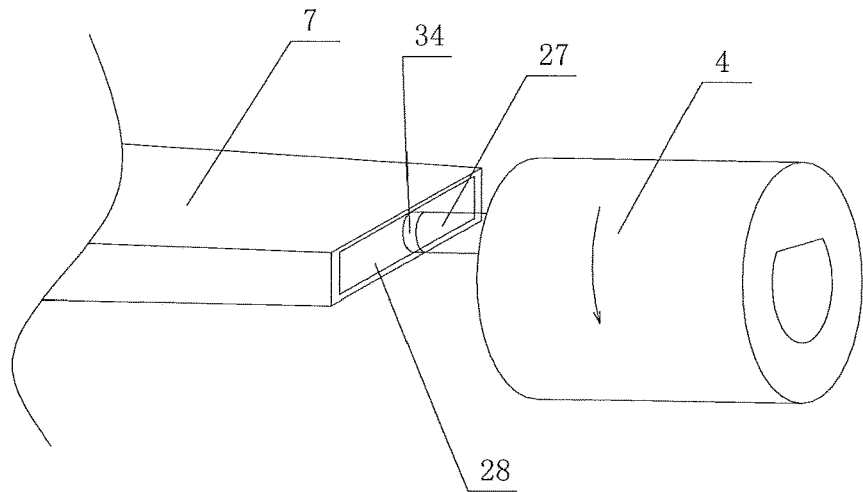
FIG. 11 is a diagram of a drive end of a shift fork lever of a clutch part of a deceleration clutch in one embodiment of the present disclosure.

As shown in FIG. 10 and FIG. 11, a driving device for a deceleration clutch of the present disclosure comprises a drive motor 1, a drive wheel 2, a shift fork lever 3, an axis of the drive wheel is perpendicular to an axis of a clutch sleeve. A bracing rod 27 is eccentrically arranged on an end surface of the drive wheel 2. The shift fork lever 3 is a lever structure and a fixed fulcrum is set in the middle part. A head portion of the shift fork lever 3 is a shift fork 6, the shift fork 6 together with return spring controls the up and down movement of the clutch sleeve. The tail portion of the shift fork lever 3 is a drive end 7, which is supported on the bracing rod 27. The drive wheel 2 rotates and the height of the bracing rod 27 changes in the axial direction of the clutch sleeve, which drives the height of the drive end 7 of the shift fork lever 3 to change and further drives the height of the shift fork 6 of the shift fork lever 3 to change. The shift fork 6 and the return spring together drive the clutch sleeve to move up and down.

The clutch sleeve 14 is driven to move up and down along the input shaft sleeve 16 by the shift fork 6. Spline teeth at the lower end of the clutch sleeve 14 are engaged with spline teeth on the motor rotor 17 when moving to the lowermost position. The input shaft 15 and the input shaft sleeve 16 rotate in the same direction at the same speed to drive the pulsator shaft and the dehydration shaft to rotate in the same direction at the same speed as a dehydration state. When the clutch sleeve 14 moves to the uppermost position, spline teeth on the upper end engage with the spline teeth on the deceleration clutch shell or the fixed bracket 12, and the input sleeve 16 can't rotate in the circumferential direction. The input shaft 15 is rotated by the deceleration clutch to drive the pulsator shaft and the dehydration shaft to rotate in the reverse direction to form a double power wash, or the dehydration shaft does not rotate and pulsator shaft rotates to form an ordinary full automatic washing, which depends on the setting of the gear train inside the deceleration clutch as a washing state.

The axis of the motor shaft of the drive motor 1 is perpendicular to the axis of the clutch sleeve 14. One end of the drive wheel 2 is mounted directly on the motor shaft of the drive motor 1, a bracing rod 27 is eccentrically arranged on the other end surface of the drive wheel 2. The drive wheel 2 is axially stationary and rotates in a circumferential direction, and the shift fork lever 3 is circumferential stationary. When the drive wheel 2 rotates in the circumferential direction, a height of the drive end 7 of the shift fork lever 3 which is supported on the bracing rod of the drive wheel 2 changes along with the change of a height in the axial direction when the bracing rod rotates, and the height of the clutch sleeve 14 a height in the axial changes. The height of the drive end 7 of the shift fork lever 3 changes, which drives the height of the shift fork 6 of the shift fork lever 3 changes and further drives the clutch sleeve 14 to move. This kind of clutch driving device has the advantages of simple structure, high driving reliability, easy installation, high integration degree of modules.

An end surface of the drive end 7 of the shift fork lever 3 is provided with a concave straight trough 28, the trough 28 is parallel to a rotation axis of the shift fork lever 3, and the bracing rod 27 extends into the trough 28 of the shift fork lever. When the drive wheel 2 rotates, the bracing rod 27 rotates about the axis of the drive wheel 2, and the bracing rod 27 is slidable only in the trough 28. It drives the shift fork lever 3 to rotate about the rotation axis, and the rotation is converted into an up-down reciprocating translation.

Preferably, an end of the bracing rod 27 is provided with a rolling bearing 34, the rolling bearing 34 sticks into the trough 28 at the drive end 7 of the shift fork lever 3. So that the bracing rod 27 and the trough 28 can be smoothly connected, the arrangement of the rolling bearing 34 can also reduce the retardation, the movement is flexible.

A length of the trough 28 is greater than twice an eccentricity of the bracing rod. This ensure the movement of the bracing rod 27 in the direction of the trough 28 after the drive wheel rotates 180°. If the clearance between the trough 28 and the bracing rod 27 is too small, the bracing rod 27 is not smoothly slid inside the trough 28 cause the friction is large. If the gap is too large, the impact is large when the direction is changed. A width of the trough is 1.05 to 1.2 times the diameter of an outer ring of the bracing rod.

The drive motor 1 is mounted on a deceleration clutch shell 13 or the drive motor is mounted on a mounting plate of the deceleration clutch. Preferably, the drive motor is mounted on the mounting plate of the deceleration clutch. Compared with the prior art, in which the traction motor is mounted on the bottom of the outer tub, the drive motor 1 of the disclosure is installed on the deceleration clutch shell or the deceleration clutch mounting plate, and has compact structure and small occupying space.

The shift fork lever 3 is a lever structure and a fixed fulcrum is set in the middle part, the middle part of the shift fork lever 3 is mounted on a fixed bracket 12 to constitute a revolute joint. The fixing bracket 12 is fixed on a deceleration clutch shell 13, or the fixed bracket 12 is integrally provided with the deceleration clutch shell 13. Preferably, the fixing bracket 12 is fixed on a deceleration clutch shell 13. It is only necessary to replace the fixing bracket 12 after the failure of the hinged position between the fixing bracket 12 and the shift lever 3 without replacing the whole deceleration clutch shell 13.

A first mounting hole is arranged at the middle of the shift fork lever 3, a second mounting hole is arranged at a corresponding position of the fixed bracket, the mounting holes are hinged by a rotary pin to form the fixed fulcrum of the shift fork lever 3. A torsion spring for providing a resetting force to the shift fork lever is further provided on the rotary pin, the torsion spring is the return spring of the shift fork lever. Preferably, the fixed fulcrum is located at the middle of the shift fork lever 3 and a side near the drive end 7. So that the movement of the smaller stroke of the drive end 7 results in a larger stroke of movement of the head.

The shift fork lever 3 of the present embodiment may not need to set a return spring, the bracing rod 27 of the drive wheel can drive the upper and lower side of the trough 28 of the drive end 7 of the shift fork lever 3, which can drive the drive end 7 of the shift fork lever 3 tail portion to move up and down. It can save a part structure, simplify the process of one-step assembly, saving material costs.

The drive wheel 2 rotates and the bracing rod 27 of the drive wheel 2 rotates about the axis of the drive wheel 2. The bracing rod 27 sticks into the trough 28 of the drive end 7 of the shift fork lever 3 and relatively slides to the trough 28. The bracing rod 27 moves upwardly in the axial direction of the clutch sleeve 14 and lifts up the drive end 7 of the shift fork lever 3. The shift fork 6 of the shift fork lever moves downwardly, which is away from the boss of the clutch sleeve 14, the limit action in the axial direction on the clutch sleeve 14 disappears. The clutch sleeve 14 moves downward under the action of the return spring and the force of gravity. The drive wheel 2 continues rotating and the bracing rod 27 moves downwardly in the axial direction of the clutch sleeve 14, which presses the drive end 7 of the shift fork lever 3 downwardly to move the shift fork upwards, and the shift fork 6 of the shift fork lever 3 pulls the clutch sleeve 14 upwards. Complete the position state switch.

Embodiment 5

A mounting structure of a clutch driving device of the embodiment is disclosed, the clutch driving device comprises a drive motor 1, a drive wheel 2 and a shift fork lever 3, the drive wheel is mounted on the output shaft of the drive wheel 1, the drive motor is fixed mounted on the deceleration clutch shell 13. Preferably, the drive motor is mounted in a mounting cover, the mounting cover is fixed on the deceleration clutch shell.

The mounting cover is formed by a hollow shell which accommodates the drive motor. One side of the mounting cover is a mounting side wall, the mounting side wall is provided with an outwardly projecting mounting flange, the mounting flange is detachably connected to the deceleration clutch shell 13 via bolts.

The mounting side wall and the mounting flange of the mounting cover are arcuate surfaces cooperating with shape of a sidewall of the shell 13, which makes the mounting cover in contact with the sidewall of the shell. It avoids a gap between the shell 13 and the mounting cover and the occurrence of clogging of the debris.

In the present embodiment, left and right sides of the mounting side wall extend outwardly to form the mounting flanges, the mounting flange are provided with mounting holes for bolt mounting.

In the present embodiment, a plurality of reinforcing ribs extending to the mounting flanges are provided on an outer wall of the mounting cover to enhance the structural strength of the flanging and improve the mounting reliability of the mounting cover. Preferably, a mounting cover sidewall on a left or a right side of the mounting side wall of the mounting cover is a left side wall or a right side wall of the mounting cover. The left side wall or the right side wall is provided with a plurality of reinforcing ribs which are provided on the outer side of the left side wall or the right side wall and are respectively horizontally extended to the mounting flanges of the corresponding side.

A lower of the mounting side wall of the mounting cover is provided with a positioning flange projecting toward the shell 13. The positioning flange is in contact with the lower surface of the shell 13 so that the mounting cover is positioned and mounted on the shell 13 for quick positioning of the relative position between the mounting cover and the shell 13. A mounting hole is respectively provided in the upper portion of the mounting flange and the positioning flange, so that the positioning flange and the mounting hole are arranged to improve the fixing reliability of the mounting cover. In the present embodiment, the reinforcing ribs are horizontally arranged at equal intervals in the middle of the mounting cover; preferably, the reinforcing ribs are positioned between the mounting holes of the positioning flange and the top of the mounting flange.

The output shaft of the drive motor 1 is vertically provided through the upper or lower side of the mounting cover, and the drive wheel 2 which rotates together with the output shaft is attached to the output end of the output shaft. Preferably, the lower side or upper side of the mounting cover is formed by a removable side wall which is detachably connected to the mounting cover by means of a snap so that the internal space of the mounting cover can be opened to facilitate the maintenance of the inner drive motor. Further preferably, the drive wheel 2 and the removable side wall are respectively provided at two different sides of the mounting cover opposite to each other to improve the ease of maintenance of the deceleration clutch.

The above description are only preferred embodiments of the disclosure. It should be noted that without departing from the design concept of the present disclosure, various variations and improvements made to the technical solutions of the present disclosure by persons skilled in the art all belong to the protection scope of the present disclosure.

The invention claimed is:

1. A driving device for a deceleration clutch, comprises:
   a drive motor,
   a drive wheel,
   a shift fork lever, and
   a clutch sleeve,
   wherein
   the drive wheel is directly arranged on a driving motor shaft,
   a drive wheel axis is parallel with an axis line of the clutch sleeve,
   the drive wheel is provided with a supporting surface having a height difference in the axial direction,
   a head of the shift fork lever is a shift fork for controlling the clutch sleeve to move up and down,
   a tail of the shift fork lever is a drive end supported on the supporting surface,
   the drive motor drives the drive wheel to rotate, and
   the tail of the shift fork lever relatively slides on the supporting surface, so that a height of the tail of the shift fork lever changes which drives a height of the head of the shift fork lever to change and further drives the clutch sleeve to move up and down.

2. The driving device for the deceleration clutch according to claim 1, wherein, the drive wheel comprises a cylindrical body, a circumferential surface or an end surface of the drive wheel is provided with the supporting surface having the height difference in the axial direction,
   at least a portion of the circumferential surface of the cylindrical body extends radially outwardly to form an arcuate projection, one surface in the axial direction of the arcuate projection is a supporting surface, and
   the supporting surface comprises an inclined first transition surface, a highest supporting surface, and a second transition surface inclining inversely with respect to the first transition surface, the first transition surface, the highest supporting surface and the second transition surface are sequentially connected in the circumferential direction.

3. The driving device for the deceleration clutch according to claim 2, wherein, a top surface or a bottom surface of the drive end of the shift fork lever is in contact with the supporting surface of the drive wheel, a contacting surface is a flat surface or a curved surface corresponding to the supporting surface.

4. The driving device for the deceleration clutch according to claim 2, wherein, an axial upper surface of the projection of the drive wheel is the supporting surface, a lower surface of the drive end of the shift fork lever is a contacting surface in contact with the supporting surface,
   the supporting surface comprises an upwardly inclined first transition surface, the highest supporting surface and a downwardly inclined second transition surface,
   the contacting surface comprises a downwardly inclined third transition surface, a highest contacting surface and an upwardly inclined fourth transition surface, or
   an axial lower surface of the projection of the drive wheel is the supporting surface, an upper surface of the drive end of the shift fork lever is the contacting surface in contact with the supporting surface, the supporting surface comprises a downwardly inclined first transition surface, the highest supporting surface and an upwardly inclined second transition surface, the contacting surface comprises an upwardly inclined third transition surface, the highest contacting surface and a downwardly inclined fourth transition surface.

5. The driving device for the deceleration clutch according to claim 4, wherein, the highest supporting surface of the drive wheel and the highest contacting surface of the shift fork are in surface contact or arc-surface contact.

6. The driving device for the deceleration clutch according to claim 2, wherein, a portion of a circumferential surface of an end portion of the drive wheel extends radially outwardly to form a projection, an other circumferential surface of the end portion is the circumferential surface of the cylindrical body.

7. The driving device for the deceleration clutch according to claim 2, wherein, an entire circumferential surface of the end portion of the drive wheel extends radially outwardly to form a projection, the projection comprises a highest supporting surface and a lowest supporting surface, the highest supporting surface and the lowest supporting surface are circumferentially spaced by 180°, a transition between the highest supporting surface and the lowest supporting surface is oblique.

8. The driving device for the deceleration clutch according to claim 1, wherein, the shift fork lever is a lever structure and a fixed fulcrum is set in a middle part, and
the middle part of the shift fork lever is mounted on a fixed bracket to constitute a revolute joint, the fixing bracket is fixed on a deceleration clutch shell, or the fixed bracket is integrally provided with the deceleration clutch shell.

9. The driving device for the deceleration clutch according to claim 8, wherein, a first mounting hole is arranged at the middle of the shift fork lever, a second mounting hole is arranged at a corresponding position of the fixed bracket, the mounting holes are hinged by a rotary pin to form the fixed fulcrum of the shift fork lever, a torsion spring for providing a resetting force to the shift fork lever is further provided on the rotary pin, and
the fixed fulcrum is located at the middle of the shift fork lever and a side near the tail.

10. A driving device for a deceleration clutch comprises:
a drive motor,
a drive wheel, and
a shift fork lever,
wherein,
the drive wheel is directly mounted on a motor shaft of the drive motor,
a drive wheel axis is parallel to an axis of a clutch sleeve,
the drive wheel in a circumferential direction is provided with a supporting slide rail with a height difference in the axial direction,
a head of the shift fork lever is a shift fork for controlling the clutch sleeve to move up and down,
a tail of the shift fork lever is a drive end supported in the supporting slide rail, and
the drive motor drives the drive wheel to rotate, the tail of the shift fork lever relatively slides in the supporting slide rail, so that a height of the tail of the shift fork lever changes which drives a height of the head of the shift fork lever to change and further drives the clutch sleeve to move up and down.

11. The driving device for the deceleration clutch according to claim 10, wherein, the drive wheel comprises a cylindrical body, the cylindrical body is radially inwardly recessed on the circumferential surface to form a circle of an axial height-gradient groove which is the supporting slide rail, a height of the supporting slide rail is changed gradually in an axial direction.

12. The driving device for the deceleration device according to claim 11, wherein, the supporting slide rail comprises a lowest supporting surface, an inclined first transition surface, a highest supporting surface and a second transition surface inclining inversely with respect to the first transition surface which are sequentially connected in the circumferential direction, and connection of each surface has smooth transition.

13. The driving device for the deceleration clutch according to claim 11, wherein, the tail of the shift fork lever has an arc wall which mates with the cylindrical body of the drive wheel, a middle of the arc wall extends perpendicularly to the arc wall and extends into the supporting slide rail of the drive wheel, and is connected with the supporting slide rail.

14. The driving device for the deceleration device according to claim 10, wherein, the tail of the shift fork lever extends into the supporting slide rail of the drive wheel, the tail of the shift fork lever includes at least a first surface in contact with the lowest supporting surface and a second surface in contact with the highest supporting surface, and the lowest support surface is in surface contact with the first surface, the highest support surface is in surface contact with the second surface.

15. The driving device for the deceleration device according to claim 10, wherein, the drive end of the shift fork lever is provided with a rolling bearing which extends into the supporting slide rail of the drive wheel.

16. A driving device for a deceleration clutch comprises:
a drive motor,
a drive wheel, and
a shift fork lever,
wherein,
the drive wheel is a cam, and a cam circumference is radially gradient,
a head of the shift fork lever is a shift fork for controlling a clutch sleeve to move up and down,
a tail of the shift fork lever is a drive end with a sliding contacting surface supported on a cam circumferential surface, and
the drive motor drives the cam to rotate, the sliding contacting surface of the shift fork lever is in contact with a circumference with a different radius of the cam to make a height change, which drives a height of the shift fork of the head of the shift fork lever to change and further drives the clutch sleeve to move up and down.

17. The driving device for the deceleration clutch according to claim 16, wherein, the cam is directly mounted on a motor shaft of the drive motor, an axis of the motor shaft of the drive motor is perpendicular to an axis of the clutch sleeve.

18. The driving device for the deceleration clutch according to claim 16, wherein, an upper side surface or a lower side surface of the drive end of the shift fork lever is in contact with the cam circumferential surface,
a position on the upper side surface or the lower side surface of the tail of the shift fork lever, that is in contact with the cam circumference corresponding to the cam circumferential surface, is concave to form a clamping slot, or
two ends, whose positions flank the cam circumferential surface, of the upper side surface or the lower side surface of the tail of the shift fork lever are convex to form a clamping slot.

19. The driving device for the deceleration clutch according to claim 16, wherein, the cam is located below the drive end of the shift fork lever, the lower side of the drive end of the shift fork lever is provided with the clamping slot which is supported on the cam circumferential surface, the shift fork lever is provided with a torsion spring which provides a resetting force to move the head of the shift fork lever upward, or
the cam is located above the drive end of the shift fork lever, the upper side of the drive end of the shift fork lever is provided with the clamping slot which is supported on the cam circumferential surface, the shift fork lever is provided with the torsion spring which provides the resetting force to move the head of the shift fork lever downward.

20. The driving device for the deceleration clutch according to claim 19, wherein, the drive motor is mounted in a mounting cover, the mounting cover is fixed on a deceleration clutch shell, the mounting cover is formed by a hollow shell which accommodates the drive motor and is an irregular square shape, one side of the mounting cover is a mounting side wall, the mounting side wall is provided with an outwardly projecting mounting flange, the mounting flange is detachably connected to the deceleration clutch shell via bolts.

* * * * *